US006724806B2

(12) United States Patent
Okumura et al.

(10) Patent No.: US 6,724,806 B2
(45) Date of Patent: Apr. 20, 2004

(54) VARIABLE RATE TRANSMISSION AND RECEPTION METHODS, AND VARIABLE RATE TRANSMISSION AND RECEPTION DEVICES

(75) Inventors: Yukihiko Okumura, Yokohama (JP); Fumiyuki Adachi, Yokohama (JP)

(73) Assignee: NTT Mobile Communications Network, Inc., Tokyo (JP)

( * ) Notice: Subject to any disclaimer, the term of this patent is extended or adjusted under 35 U.S.C. 154(b) by 0 days.

(21) Appl. No.: 09/230,190

(22) PCT Filed: May 15, 1998

(86) PCT No.: PCT/JP98/02161
§ 371 (c)(1),
(2), (4) Date: Jan. 15, 1999

(87) PCT Pub. No.: WO98/52307
PCT Pub. Date: Nov. 19, 1998

(65) Prior Publication Data
US 2002/0094011 A1 Jul. 18, 2002

(30) Foreign Application Priority Data
May 16, 1997 (JP) .............................................. 9/127076
Sep. 12, 1997 (JP) .............................................. 9/249199

(51) Int. Cl.$^7$ .......................... H04B 15/00; H04K 1/00; H04L 27/30
(52) U.S. Cl. ........................ 375/142; 375/146; 375/150
(58) Field of Search ................................ 375/140, 146, 375/141, 147, 150, 142; 370/320, 335, 342, 441

(56) References Cited
U.S. PATENT DOCUMENTS
5,204,876 A 4/1993 Bruckert et al.
5,341,396 A 8/1994 Higgins et al.
5,751,761 A * 5/1998 Gilhousen .................... 375/200

FOREIGN PATENT DOCUMENTS
JP 06-177853 6/1994
JP 09-018450 1/1997
WO WO 95/03652 2/1995

OTHER PUBLICATIONS
F. Adachi et al., "Wideband Multi–Rate DS–CDMA for Next Generation Mobile Communications Systems", 1997 IEEE Wire Communications Conference, pp. 57–62.
J. Zhu et al., "Principal and Performance of Variable Rate Multi–Code CDMA Method", IEEE, pp. 256–259.

* cited by examiner

Primary Examiner—Phoung Phu
(74) Attorney, Agent, or Firm—Brown Raysman Millstein Felder & Steiner LLP (57) ABSTRACT

A transmission method for implementing variable rate transmission. Part of the baseband processing of a transmitter based on a CDMA transmission scheme is described. A transmitted information sequence in the form of a digital signal is phase modulated by a phase modulator 105. An orthogonal code generator 101 selects, in response to rate information of the transmitted signal, the orthogonal code to be generated. The bit rate of the orthogonal code the orthogonal code generator 101 generates is double the maximum transmission rate. The modulated transmitted signal is multiplied by the orthogonal code corresponding to the rate information with a multiplier 103. The transmitted signal, which is multiplied by the orthogonal code corresponding to the rate information, is further multiplied by a spreading code sequence with a multiplier 104 to be spread into a CDMA signal, and is transmitted under power transmission control based on the rate information. A receiving side can detect the rate without information about the transmission rate.

34 Claims, 8 Drawing Sheets

FIG.1

$$C_2 = \begin{pmatrix} C_2(1) \\ C_2(2) \end{pmatrix} = \begin{pmatrix} 1 & 1 \\ 1 & -1 \end{pmatrix}$$

$$C_4 = \begin{pmatrix} C_4(1) \\ C_4(2) \\ C_4(3) \\ C_4(4) \end{pmatrix} = \begin{pmatrix} C_2(1) & C_2(1) \\ C_2(1) & \overline{C_2(1)} \\ \hline C_2(2) & C_2(2) \\ C_2(2) & \overline{C_2(2)} \end{pmatrix}$$

$$\vdots$$

$$C_{2n} = \begin{pmatrix} C_{2n}(1) \\ \vdots \\ C_{2n}(2n) \end{pmatrix} = \begin{pmatrix} C_n(1) & C_n(1) \\ C_n(1) & \overline{C_n(1)} \\ \hline \vdots & \vdots \\ \hline C_n(n) & C_n(n) \\ C_n(n) & \overline{C_n(n)} \end{pmatrix}$$

NOTE: $\overline{C_a}(b)$ DESIGNATES ROW VECTOR IN WHICH 1 AND -1 IN $C_a(b)$ ARE INVERTED

$C_n(1) \sim C_n(n)$ CORRESPOND TO n ROWS CONSTITUTING A MATRIX $C_n$

VARIABLE RATE TRANSMISSION AND RECEPTION METHODS, AND VARIABLE RATE TRANSMISSION AND RECEPTION DEVICES

TECHNICAL FIELD

The present invention relates to a variable rate transmission method in radio communications, and more particularly to a variable rate transmission method and equipment for implementing it, which are applicable to direct spreading code division multiple access (DS-CDMA) in mobile communications.

BACKGROUND ART

In DS-CDMA, information data undergoes narrow-band carrier modulation (such as binary phase shift keying or quadrature phase shift keying), followed by spreading using a higher rate binary spreading code sequence, and by transmission. On a receiving side, the received signal is-multiplied by the same binary spreading code sequence as that used in the transmission to acquire the original narrow-band modulated signal, followed by demodulation to the original transmitted data.

In actual communications, however, the information rate is not always kept constant. For example, although voice communications is carried out at a rate of about 8 kbps, pauses in which no voice signal is present takes place frequently, and lowering the information rate in the pauses little degrades the voice quality. It is very important for the CDMA to reduce transmission power during a low information rate to minimize interference on other channels.

This is because the magnitude of interference determines the communication quality. Thus, implementation of the variable rate transmission method is important in the CDMA.

As one of the variable rate methods, intermittent transmission is known. It carries out, during a maximum information rate, continuous transmission, but reduces, at lower rates, the average transmission rate down to an information rate by decreasing the ratio of transmission intervals with maintaining the instantaneous transmission rate at the maximum, thereby trying to reduce the interference amount.

As for the intermittent transmission, refer to the following literature.

Reference 1: R. Padovani, R., "Reverse link performance of IS-95 based cellular systems", IEEE Personal Communications, pp. 28–34, 3rd Quarter, 1994.

Reference 2: Y. Okumura and F. Adachi, "Variable rate data transmission with blind rate detection for coherent DS-CDMA mobile radio", IEE Electron Lett. vol. 32, pp. 1865–1866, September 1996.

As another variable rate transmission method in the CDMA, continuous transmission is known which not only varies the instantaneous transmission rate of radio in response to variations in the information rate, but also controls the transmission power in response to the transmission rate.

The average interference amount can also be reduced in the continuous transmission as in the intermittent transmission because the transmission power is varied (in inverse proportion to) the transmission rate in the continuous transmission.

In the CDMA technology, the transmission power control is essential which controls the transmission power so that a received SIR (signal to interference ratio) measured on the receiving side matches a predetermined target SIR in response to results obtained by comparing the two values (refer to Japanese patent application laid-open No. 8-162972/1996 applied by the assignee of the present invention, for example). In this technique, the SIR of a received signal is measured slot by slot and compared with the target SIR, the slot being defined as a section in a received signal sandwiched by two successive pilot signals of a known pattern which are transmitted periodically. Then, a transmission control command is generated in response to the compared result, and is transmitted to the transmitting side to be reflected on the transmission power control. The transmission period of the transmission power control command is a slot interval, that is, the measuring interval.

The transmission power control cannot maintain constant reception quality if it uses the same target SIR for different rates when varying the transmission power in response to the transmission rate. Therefore, the conventional transmission power control that employs the target SIR cannot be applied without change to a transmitted signal whose transmission power is controlled in response to the transmission rate.

DISCLOSURE OF THE INVENTION

An object of the present invention is to provide a transmitting method and receiving method and equipment for implementing the variable rate transmission method employing the foregoing continuous transmission scheme.

Another object of the present invention is to implement the transmission power control capable of achieving constant receiving quality on the receiving side regardless of rate variations when the transmission power is varied in response to the transmission rate (in inverse proportion to it, for example).

In order to accomplish the objects aforementioned, according to the invention claimed in claim 1 a variable rate transmission method comprising the steps of:

preparing a plurality of orthogonal codes whose lengths differ from each other and whose information rates are at least twice a maximum information rate, for one communication with one receiving side in which a rate of information to be transmitted changes, before the communication starts;

selecting, during the communication, in accordance with the changing rate of information to be transmitted, one of the prepared orthogonal codes;

multiplying a signal to be transmitted including the information by the selected orthogonal code; and transmitting the signal to be transmitted which has been multiplied by the selected orthogonal code, without increasing transmission amount for transmitting information about the selected orthogonal code, during the communication, wherein each of the plurality of orthogonal codes corresponds to each value that the rate of information to be transmitted assumes.

The method further includes continuously transmitting the signal which has been multiplexed by the selected orthogonal code, even if the selected orthogonal code has changed.

According to the invention as claimed in claim 2, in the variable rate transmission method as claimed in claim 1, where the step of preparing the orthogonal codes prepares orthogonal codes obtained by successively generating, using lower degree matrices under a predetermined rule, higher degree ($2^N \times 2^N$ elements, where N is an integer equal to or greater than one) matrices with their row vectors orthogonal to each other, and by selecting one of row vectors of one of the matrices with a degree varying in accordance with each value that the rate of information to be transmitted assumes.

According to the invention as claimed in claim 3, in the variable rate transmission method as claimed in claim 2, where the step of preparing orthogonal codes prepares the orthogonal codes such that the orthogonal codes no not include both an orthogonal code corresponding to one of row vectors of a $2^k \times 2^k$ element matrix (k is an integer less than N), and an orthogonal code corresponding to any one of row vectors of any one of $2^j \times 2^j$ element matrices (j is an integer greater than k) which includes as its sub-vector, the one of the row vectors of the $2^k \times 2^k$ element matrix or a row vector obtained by inverting the one of the row vectors of the $2^k \times 2^k$ element matrix.

According to the invention claimed in claim 4, in the variable rate transmission method as claimed in claim 1, the signal is further multiplied by a spreading code sequence to be spectrum spread, and is transmitted at transmission power corresponding to the rate of information to be transmitted.

According to the invention as claimed in claim 5, the variable rate transmission method as claimed in claim 4, further comprises the steps of:

inserting pilot symbols of a known pattern periodically into data symbols corresponding to the information to be transmitted; and varying the rate on a frame by frame basis, the frame consisting of a plurality of slots defined by the pilot symbols.

According to the invention as claimed in claim 6, the variable rate transmission method as claimed in claim 5, further comprises the step of controlling the transmission power on a slot by slot basis in response to a transmission power control command sent from a receiving side.

According to the invention as claimed in claim 7, the variable rate transmission method as claimed in claim 6, further comprises the step of transmitting, in a slot immediately after a rate change, the pilot symbols at power corresponding to the rate before the rate change.

According to the invention as claimed in claim 8, the variable rate transmission method as claimed in claim 6, further comprises the step of suspending the transmission power control by the transmission power control command that is associated with at least one of slots immediately after a rate change.

According to the invention as claimed in claim 9, in the variable rate transmission method as claimed in claim 8, a number of slots with which the transmission power control is suspended is determined in response to transmission quality.

According to the invention as claimed in claim 10, in the variable rate transmission method as claimed in claim 5, the pilot symbols are transmitted at a same rate as that of said frame.

According to the invention as claimed in claim 11, in the variable rate transmission method as claimed in claim 5, the pilot symbols are transmitted at a fixed rate.

According to the invention as claimed in claim 12, a variable rate receiving method for receiving a signal transmitted by the variable rate transmission method as claimed in claim 1, comprises the steps of:

generating a sampled sequence of a received signal by sampling the received signal at a rate of one of the orthogonal codes, and calculating correlations between the sampled sequence of the received signal and the plurality of orthogonal codes with different lengths;

deciding an orthogonal code that gives a maximum correlation by comparing correlation values obtained as a result of the calculation of the correlations; and demodulating the received signal by multiplying the sampled sequence of the received signal by the orthogonal code that gives the maximum correlation value.

According to the invention as claimed in claim 13, a receiving method for receiving a signal transmitted by the variable rate transmission method as claimed in claim 6, comprises the steps of:

generating a sampled sequence of a received signal by sampling the received signal at a rate of one of the orthogonal codes;

calculating correlations between the sampled sequence of the received signal and the plurality of orthogonal codes with different lengths;

deciding an orthogonal code that gives a maximum correlation by comparing correlation values obtained as a result of the calculation of the correlations;

demodulating the received signal by multiplying the sampled sequence of the received signal by the orthogonal code that gives the maximum correlation value, and measuring a received SIR for each slot of the received signal;

correcting the received SIR according to a rate of the orthogonal code decided by the step of deciding;

comparing the corrected received SIR with a target SIR; and generating a transmission power control command in response to a result of the comparing.

According to the invention as claimed in claim 14, in the receiving method as claimed in claim 13, demodulation of the received signal is carried out slot by slot.

According to the invention as claimed in claim 15, a receiving method for receiving a signal transmitted by the variable rate transmission method as claimed in claim 7 comprises the steps of:

generating a sampled sequence of a received signal by sampling the received signal at a rate of one of the orthogonal codes;

calculating correlations between the sampled sequence of the received signal and the plurality of orthogonal codes with different lengths;

deciding an orthogonal code that gives a maximum correlation by comparing correlation values obtained as a result of the calculation of the correlations;

demodulating the received signal by multiplying the sampled sequence of the received signal by the orthogonal code that gives the maximum correlation value;

measuring a received SIR of the pilot symbols for a slot immediately after a rate change, and a received SIR for each of other slots;

correcting the received SIR for each of other slots according to a rate decided by the decision of the orthogonal code;

correcting the received SIR of the pilot symbols according to a rate before the rate change;

comparing the corrected received SIR with a target SIR; and generating a transmission power control command in response to a result of the comparing.

According to the invention as claimed in claim 16, a receiving method for receiving a signal transmitted by the variable rate transmission method as claimed in claim 11, comprises the steps of:

generating a sampled sequence of a received signal by sampling the received signal at a rate of one of the orthogonal codes;

calculating correlations between the sampled sequence of the received signal and the plurality of orthogonal codes with different lengths;

deciding an orthogonal code that gives a maximum correlation by comparing correlation values obtained as a result of the calculation of the correlations;

demodulating the received signal by multiplying the sampled sequence of the received signal by the orthogonal code that gives the maximum correlation value;

measuring a received SIR of the pilot symbols at the fixed rate;

correcting the received SIR according to a rate decided by the decision of the orthogonal code;

comparing the corrected received SIR with a target SIR; and generating a transmission power control command in response to a result of the comparing.

According to the invention claimed in claim 17, a variable rate transmitter comprising:

an orthogonal code generator for preparing a plurality of orthogonal codes whose lengths differ from each other and whose information rates are at least twice a maximum information rate, for one communication with one receiving side in which a rate of information to be transmitted changes, before the communication starts, and generating, during the communication, in accordance with the changing rate of information to be transmitted, one of the prepared orthogonal codes;

a multiplier for multiplying a signal to be transmitted including the information by the orthogonal code fed from the orthogonal code generator; and a transmitter for transmitting the signal to be transmitted which has been multiplied by the orthogonal code fed from the orthogonal code generator, without increasing transmission amount for transmitting information about the orthogonal code fed from the orthogonal code generator, during the communication, wherein each of the plurality of orthogonal codes corresponds to each value that the rate of information to be transmitted assumes.

The transmitter further includes means for continuously transmitting the signal which has been multiplexed by the orthogonal code fed from the orthogonal code generator, even if the orthogonal code fed from the orthogonal code generator has changed.

According to the invention claimed in claim 18, in the variable rate transmitter as claimed in claim 17, the orthogonal code generator prepares orthogonal codes obtained by successively generating, using lower degree matrices under a predetermined rule, higher degree ($2^N \times 2^N$ elements, where N is an integer equal to or greater than one) matrices with their row vectors orthogonal to each other, and by selecting one of row vectors of one of the matrices with a degree varying in accordance with each value that the rate of information to be transmitted assumes.

According to the invention claimed in claim 19, variable rate transmitter as claimed in claim 18, where the orthogonal code generator prepares orthogonal codes such that the orthogonal codes do not include both a orthogonal code corresponding to one of row vectors of a $2^k \times 2^k$ element matrix. (k is an integer less than N), and an orthogonal code corresponding to any one of row vectors of any one of $2^j \times 2^j$ element matrices. (j is an integer greater than k), which includes as its sub-vector, the one of the row vectors of the $2^k \times 2^k$ element matrix or a row vector obtained by inverting the one of the row vectors of the $2^k \times 2^k$ element matrix.

According to the invention as claimed in claim 20, the variable rate transmitter as claimed in claim 17, further comprises:

a spreading sequence generator for generating a spreading code sequence for spectrum spreading;

a multiplier for multiplying the signal by the spreading code sequence fed from the spreading sequence generator; and a transmitter for varying transmission power in response to the rate of information to be transmitted.

According to the invention as claimed in claim 21, the variable rate transmitter as claimed in claim 20, further comprises a pilot symbol generator for generating pilot symbols of a known pattern periodically, wherein the pilot symbols are inserted into data symbols corresponding to the information to be transmitted, and the rate is varied on a frame by frame basis, the frame consisting of a plurality of slots defined by the pilot symbols.

According to the invention as claimed in claim 22, the variable rate transmitter as claimed in claim 21, further comprises a transmission power controller for controlling the transmission power on a slot by slot basis in response to a transmission power control command sent from a receiving side.

According to the invention as claimed in claim 23, in the variable rate transmitter as claimed in claim 22, the pilot symbols are transmitted, in a slot immediately after a rate change, at power corresponding to the rate before the rate change.

According to the invention as claimed in claim 24, in the variable rate transmitter as claimed in claim 21, where the pilot symbols are transmitted at a same rate as that of the frame.

According to the invention as claimed in claim 25, in the variable rate transmitter as claimed in claim 21, where the pilot symbols are transmitted at a fixed rate.

According to the invention as claimed in claim 26, in the variable rate transmitter as claimed in claim 22, the transmission power control by the transmission power control command that is associated with at least one of slots immediately after a rate change is suspended.

According to the invention as claimed in claim 27, in the variable rate transmitter as claimed in claim 26, a number of slots with which the transmission power control is suspended is determined in response to transmission quality.

According to the invention as claimed in claim 28, a variable rate receiver for receiving a signal transmitted by the variable rate transmission method as claimed in claim 1 comprises:

a sampler for generating a sampled sequence of a received signal by sampling the received signal at a rate of one of the orthogonal codes;

a correlator for calculating correlations between the sampled sequence of the received signal from the sampler and the plurality of orthogonal codes with different lengths;

an orthogonal code decision block for deciding an orthogonal code that gives a maximum correlation by comparing correlation values obtained as a result of the calculation of the correlations;

an orthogonal code generator for generating the orthogonal code decided by the orthogonal code decision block; and a multiplier for multiplying the sampled sequence of the received signal by the orthogonal code from the orthogonal code generator to demodulate the received signal.

According to the invention as claimed in claim 29, a receiver for receiving a signal transmitted by the variable rate transmission method as claimed in claim 6 comprises:

a sampler for generating a sampled sequence of a received signal by sampling the received signal at a rate of one of the orthogonal codes;

a correlator for calculating correlations between the sampled sequence of the received signal and the plurality of orthogonal codes with different lengths;

an orthogonal code decision block for deciding an orthogonal code that gives a maximum correlation by comparing correlation values obtained as a result of the calculation of the correlations;

an orthogonal code generator for generating the orthogonal code decided by the orthogonal code decision block;

a multiplier for multiplying the sampled sequence of the received signal by the orthogonal code from the orthogonal code generator;

a received SIR for measuring a received SIR for each slot of the received signal;

a correcting block for correcting the received SIR according to a rate of the orthogonal code decided; and a comparator for comparing the corrected received SIR with a target SIR, wherein a transmission power control command is generated in response to a result of the comparing.

According to the invention as claimed in claim 30, in the receiver as claimed in claim 29, demodulation of the received signal is carried out slot by slot.

According to the invention as claimed in claim 31, a receiver for receiving a signal transmitted by the variable rate transmission method as claimed in claim 7 comprises:

a sampler for generating a sampled sequence of a received signal by sampling the received signal at a rate of one of the orthogonal codes;

a correlator for calculating correlations between the sampled sequence of the received signal from the sampler and the plurality of orthogonal codes with different lengths;

an orthogonal code decision block for deciding an orthogonal code that gives a maximum correlation by comparing correlation values obtained as a result of the calculation of the correlations;

an orthogonal code generator for generating the orthogonal code decided by the orthogonal code decision block;

a multiplier for multiplying the sampled sequence of the received signal by the orthogonal code from the orthogonal code generator;

a received SIR measuring block for measuring a received SIR of the pilot symbols for a slot immediately after a rate change, and a received SIR for each of other slots;

a correcting block for correcting the received SIR for each of other slots according to a rate decided by the decision of the orthogonal code, and for correcting the received SIR of the pilot symbols according to a rate before the rate change; and a comparator for comparing the corrected received SIR with a target SIR, wherein a transmission power control command is generated in response to a result of the comparing.

According to the invention as claimed in claim 32, a receiver for receiving a signal transmitted by the variable rate transmission method as claimed in claim 11 comprises:

a sampler for generating a sampled sequence of a received signal by sampling the received signal at a rate of one of the orthogonal codes;

a correlator for calculating correlations between the sampled sequence of the received signal and the plurality of orthogonal codes with different lengths;

an orthogonal code decision block for deciding an orthogonal code that gives a maximum correlation by comparing correlation values obtained as a result of the calculation of the correlations;

a multiplier for multiplying the sampled sequence of the received signal by the orthogonal code that gives the maximum correlation value;

a received SIR measuring block for measuring a received SIR of the pilot symbols at the fixed rate;

a correcting block for correcting the received SIR according to a rate decided by the decision of the orthogonal code; and a comparator for comparing the corrected received SIR with a target SIR, wherein a transmission power control command is generated in response to a result of the comparing.

BEST MODE FOR CARRYING OUT THE INVENTION

The invention will now be described with reference to the accompanying drawings.

Figure 1:
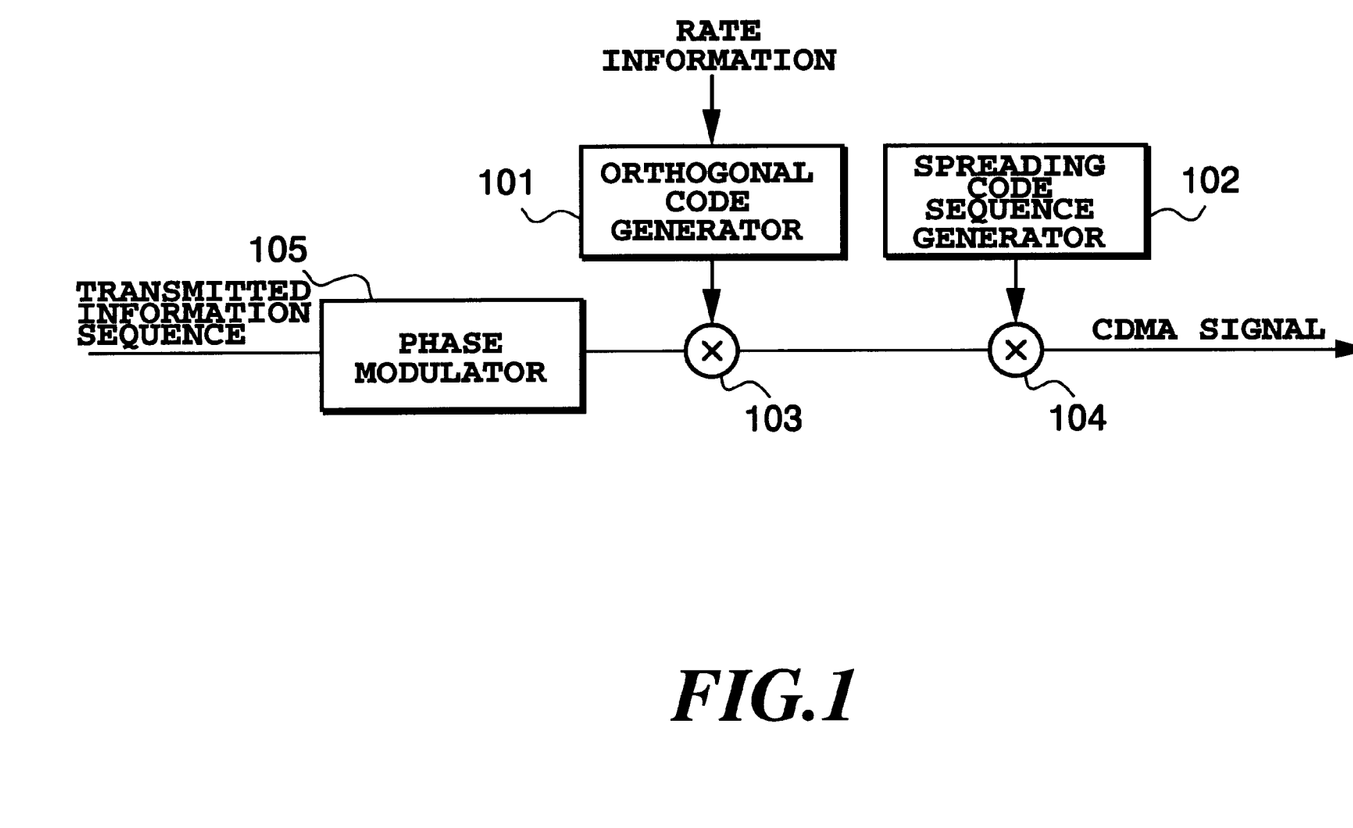
FIG. 1 is a block diagram of a transmitter.

FIG. 1 is a block diagram showing an embodiment in accordance with the present invention, which illustrates part of a baseband processing in a transmitter based on the CDMA transmission scheme. In FIG. 1, the reference numeral 105 designates a phase modulator for performing phase modulation of a transmitted information sequence in the form of a digital signal. The reference numeral 103 designates a multiplier for multiplying the phase modulated transmitted signal by an orthogonal code generated by an orthogonal code generator 101 in response to a transmission rate. The multiplied transmitted signal is further multiplied in a multiplier 104 by a spreading code sequence fed from a spreading code sequence generator 102, thereby being spread.

The orthogonal code generator 101 selects its generating orthogonal code in accordance with the rate information of the transmitted signal. The bit rate of the orthogonal code generated by the orthogonal code generator 101 is double the maximum transmission rate.

The multiplier 103 multiplies the modulated transmitted signal by the orthogonal code corresponding to the rate information. The transmitted signal multiplied by the orthogonal code corresponding to the rate information is further multiplied by the spreading code sequence with the multiplier 104 to be spectrum spread into a CDMA signal which is transmitted under the transmission power control in response to the rate information.

In FIG. 1, the orthogonal code employed by the transmission method when the information rate is 1/Q of the maximum rate is a sequence of a total of 2Q binary codes consisting of Q consecutive 1s and Q consecutive −1s, for example. Since the duration of the orthogonal code equals one information length, the bit rate of the orthogonal code is always double the maximum information rate. The orthogonal code generated by the orthogonal code generator 101 will now be described in detail.

Figure 2:
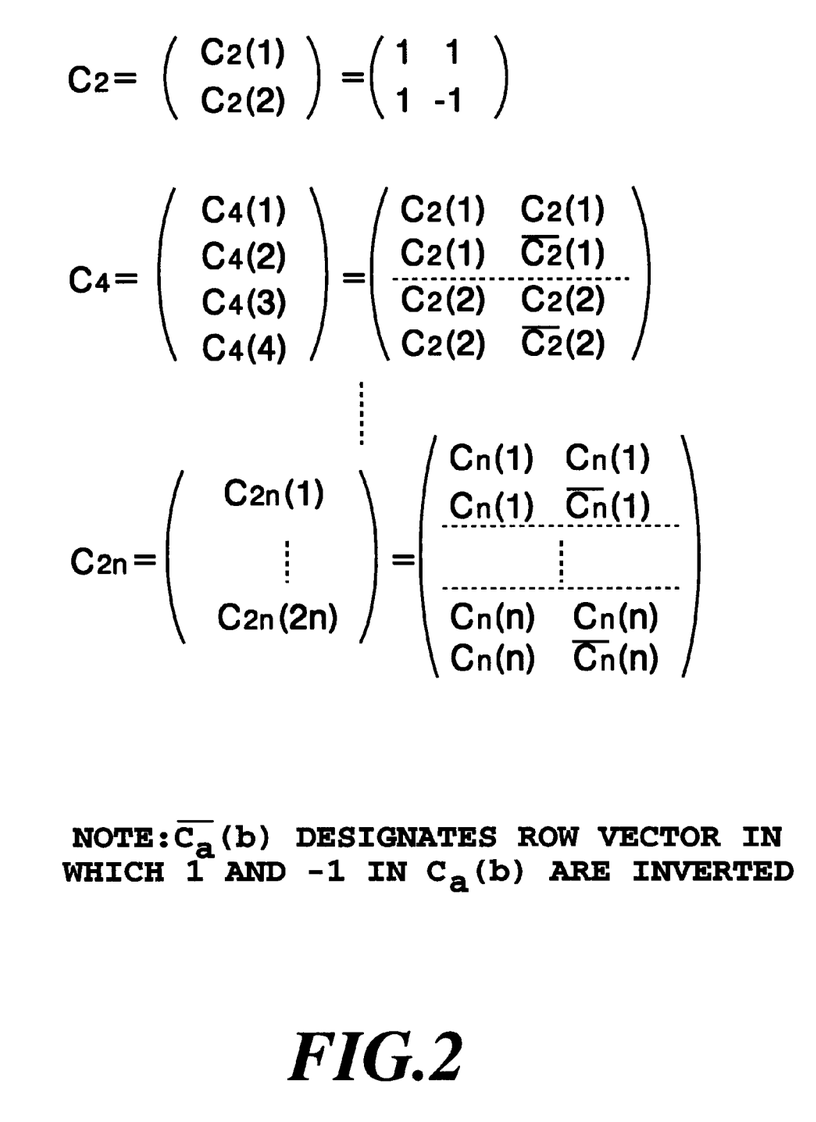
FIG. 2 is a table illustrating a generating scheme of orthogonal code sequences.

The orthogonal code produced by the orthogonal code generator 101 is generated according to a certain rule as shown in FIG. 2. In FIG. 2, a matrix $C_2$ consists of row vectors $C_2(1)=(1,1)$ and $C_2(2)=(1,-1)$. $\overline{C}_2(1)$ and $\overline{C}_2(2)$ represent row vectors in which 1 and −1 in $C_2(1)$ and $C_2(2)$ are inverted, that is, $\overline{C}_2(1)=(-1,-1)$ and $\overline{C}_2(2)=(-1,1)$, respectively. Thus, $C_{2n}$ is defined as shown in FIG. 2.

The row vectors of the matrices generated here become Walsh functions

Figure 3:
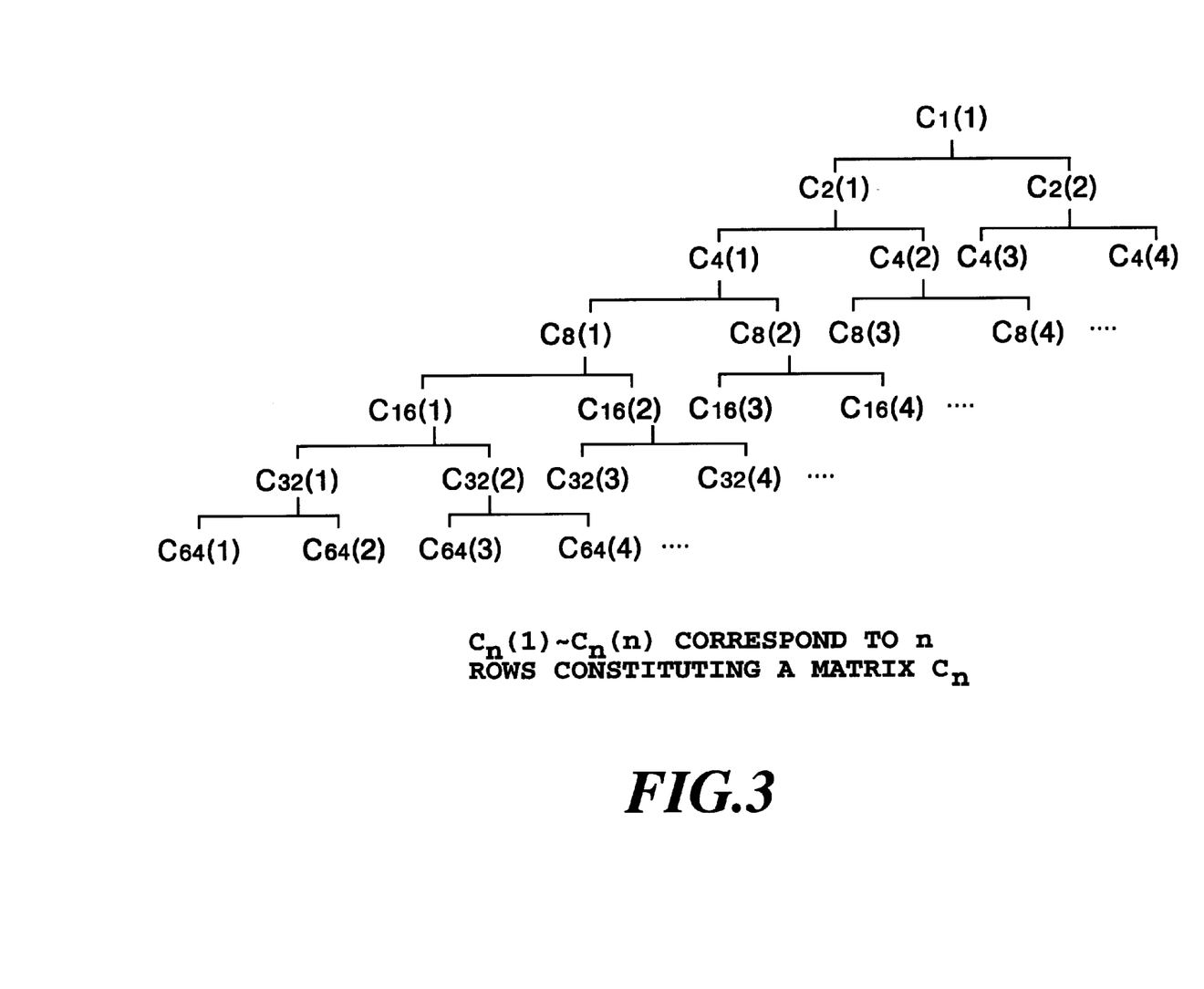
FIG. 3 is a graph illustrating a structure of the orthogonal code sequences.

FIG. 3 illustrates row vectors of matrices in a hierarchical structure.

The suffix to a symbol C represents the degree of the matrix. In FIG. 3, the maximum degree is 64. At the minimum transmission rate, one of the 64 row vectors $\{C_{64}(1), \ldots, C_{64}(64)\}$ is generated as the orthogonal code. At the transmission rate double the minimum transmission rate, one of the 32 row vectors $\{C_{32}(1), \ldots, C_{32}(32)\}$ is assigned as the orthogonal code. In assigning one of the row vectors in the matrix of a particular degree, a row vector is selected which does not include any lower hierarchical row vectors which are already assigned.

In other words, when selecting one of the row vectors of $2^k \times 2^k$ matrix as the orthogonal code, where k is an integer, any row vectors in the entire $2^j \times 2^j$ matrices, which are already assigned, where j is an integer greater than k, are not included in that row vector to be selected or its inverted row vector, as sub-vectors.

Figure 4:
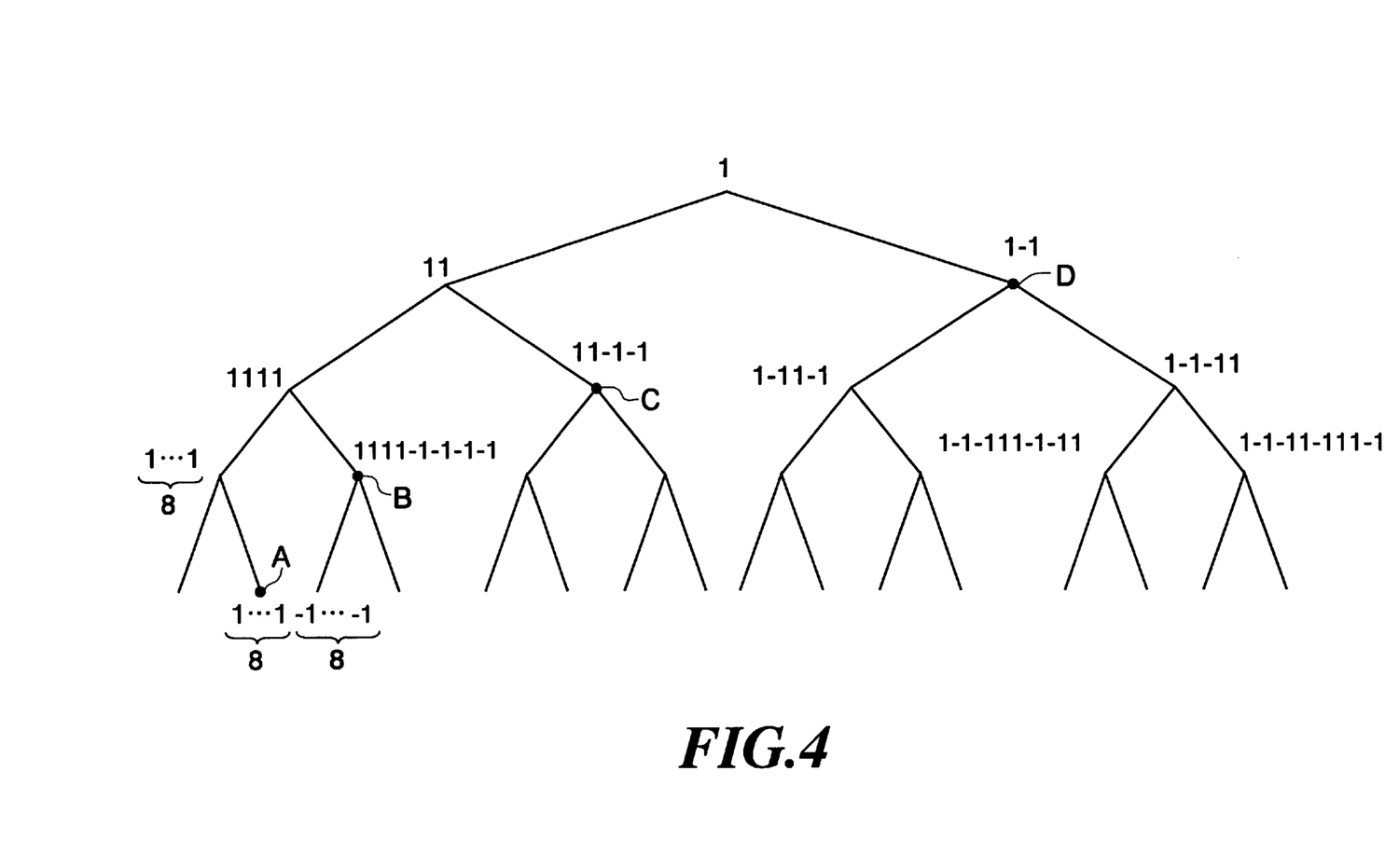
FIG. 4 is a graph illustrating orthogonal code sequences to be used.

FIG. 4 illustrates more concretely the orthogonal codes which are generated at respective transmission rates.

In FIG. 4, the orthogonal codes with the rate twice the maximum information transmission rate are illustrated in the hierarchical structure as in FIG. 3. In this figure, the orthogonal codes the orthogonal code generator 101 of FIG. 1 generates are shown at points A, B, C and D. Each point A indicates the orthogonal code corresponding to the minimum transmission rate (equal to ⅛ of the maximum transmission rate), and each point D represents the orthogonal code with a transmission rate eight times that of the minimum rate (that is, the maximum transmission rate). As illustrated in FIG. 4, the orthogonal codes associated with the points D have two bits per unit information length.

The orthogonal codes as shown in FIGS. 1 and 4 are explained in connection with the orthogonal codes with a bit rate twice the maximum transmission rate. The bit rate of the orthogonal codes in use, however, can be $2^n$ times such as four times, eight times, etc. of the maximum information rate, where n is a natural number.

Figure 5A:
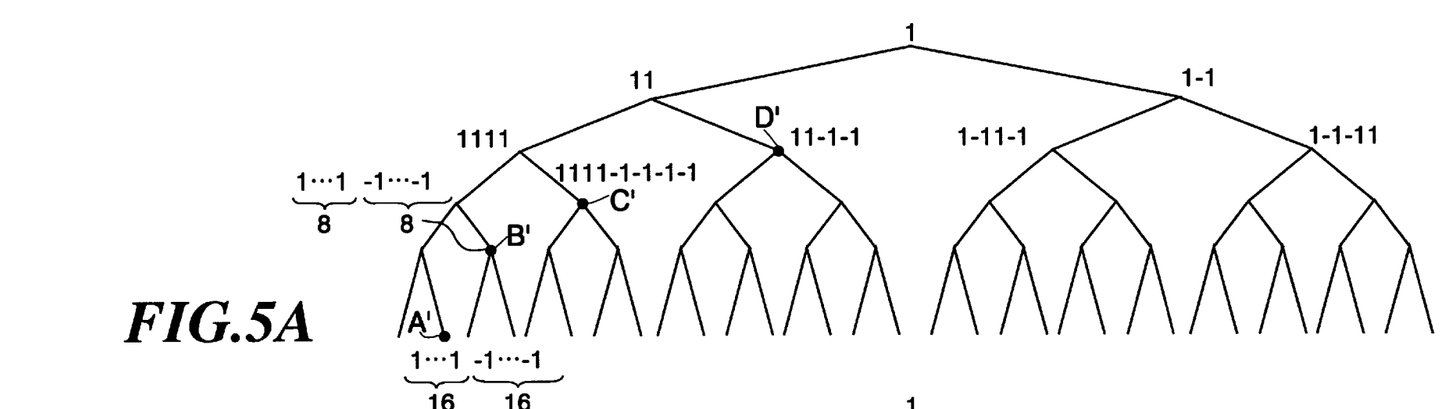
FIGS. 5A and 5B are graphs each illustrating other orthogonal code sequences to be used.
Figure 5B:
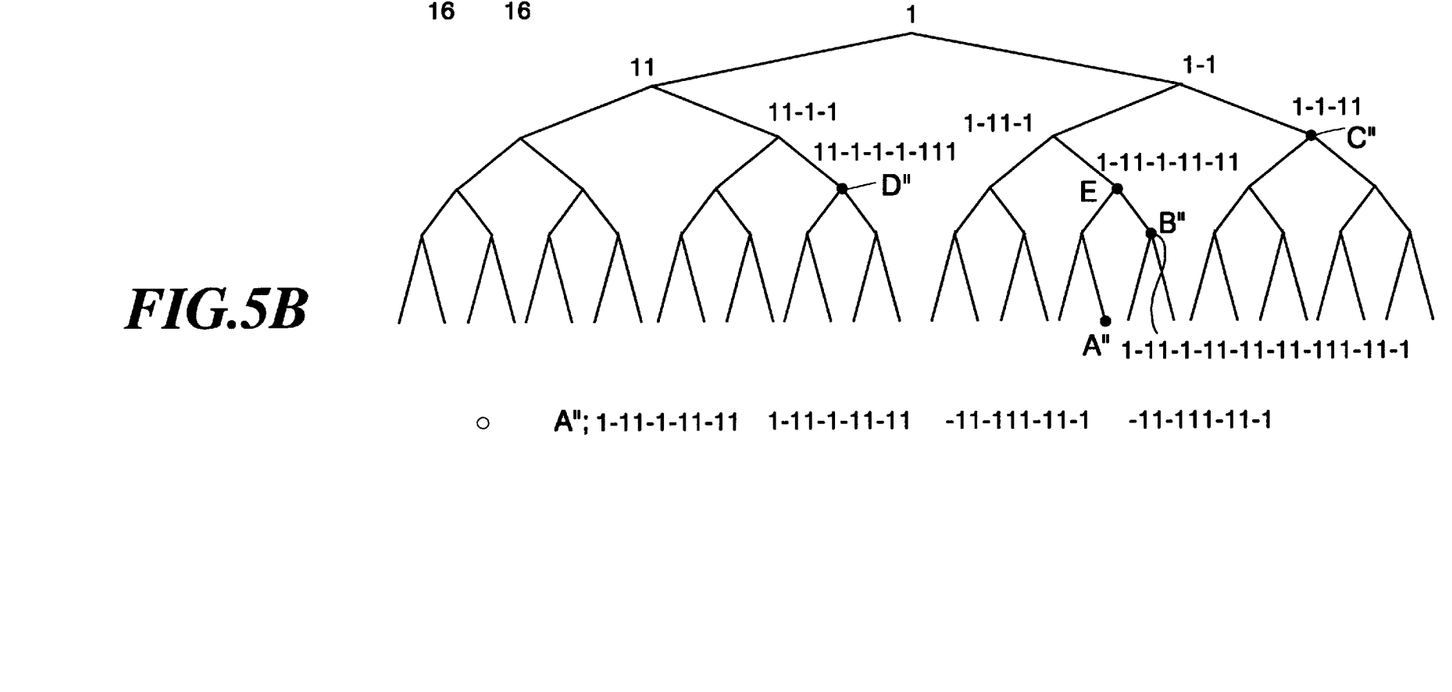

FIGS. 5A and 5B show examples, in which the bit rate of the orthogonal codes in use is four times the maximum transmission rate. In FIG. 5A, each point A' represents the orthogonal code associated with the minimum transmission rate (equal to ⅛ of the maximum transmission rate), and each point D' indicates the orthogonal code with a rate eight times that of the minimum transmission rate (that is, the maximum transmission rate).

The orthogonal codes associated with the points D' of FIG. 5A have four bits per unit information length. FIG. 5B shows another example, in which the bit rate of the orthogonal codes is four times the maximum transmission rate. As shown in FIGS. 5A and 5B, the orthogonal code can be used which is selected in a particular level of the hierarchy such that it does not include any lower level orthogonal codes linked to the selected one in the hierarchy. For example, since the point E in FIG. 5B includes the lower level points A" and B" in use, the point D" is selected which does not include those points A" and B".

Figure 6:
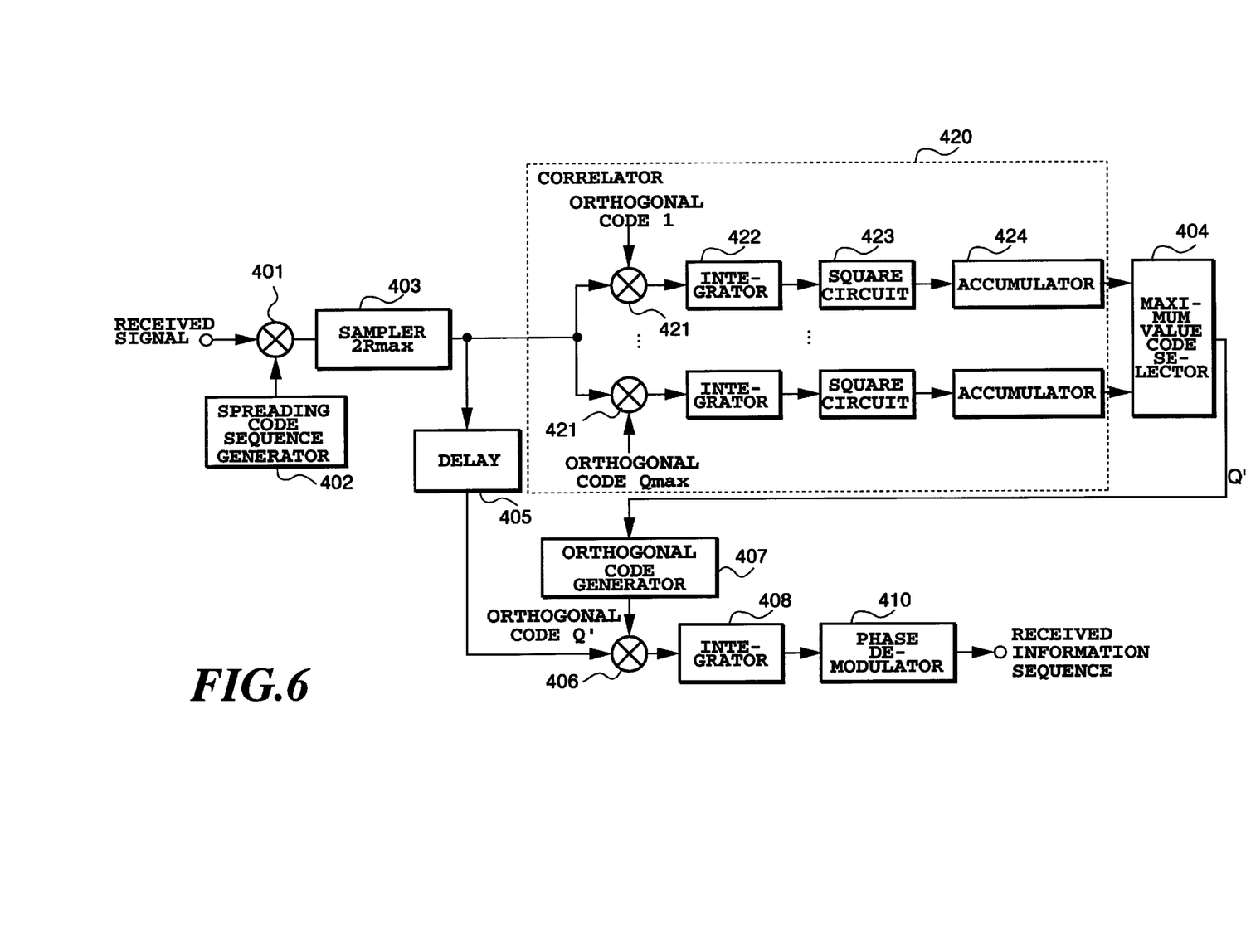
FIG. 6 is a block diagram showing a receiver.

When the CDMA signal thus transmitted is received, the transmission rate can be decided directly from the signal. This will now be described with reference to FIG. 6, a block diagram showing a configuration of a demodulator of a receiving side. FIG. 6 shows only a stage after the transmitted signal is received, converted into the baseband, and further converted into a digital form.

In FIG. 6, the reference numeral 401 designates a multiplier for despreading the received signal by multiplying it by the spreading code sequence fed from the spreading code sequence generator 402. The reference numeral 403 designates a sampler that samples the output of the multiplier 401 at the bit rate of the orthogonal code, that is, at a rate twice the maximum information transmission rate. The reference numeral 420 designates a correlator that calculates correlations by multiplying the despread and sampled received signal by the orthogonal codes which are used for respective transmission rates on the transmitting side. For example, when the transmitted signal uses the orthogonal codes as illustrated in FIG. 4, the correlations are calculated with four orthogonal codes. The correlator 420 includes, for each orthogonal code, a multiplier 421, an integrator 422, a square circuit 423 and an accumulator 424, and calculates the correlations with the orthogonal codes by carrying out parallel operations with the orthogonal codes. The integrators 422 each integrate during unit information length of the corresponding information rate, and the accumulators 424 also add at every unit information length interval. For example, in the orthogonal codes in FIG. 4, the addition is carried out eight times at the minimum information rate. The reference numeral 404 designates a maximum value code selector that receives the results of the correlator 420, and selects the orthogonal code with the maximum correlation value.

The reference numeral 405 designates a delay for delaying the received signal until the maximum value code selector 404 detects the orthogonal code with the maximum correlation value. The reference numeral 407 designates an orthogonal code generator for generating the orthogonal code selected by the maximum value code selector 404, and 406 designates a multiplier that multiplies the sampled received signal by the orthogonal code. The reference numeral 408 designates an integrator for integrating during unit information period of the corresponding information rate, and 410 designates a phase demodulator for demodulating the received signal.

In FIG. 6, the baseband digital received signal is despread by the multiplier 401 using the spreading code sequence, followed by sampling of the despread signal by the sampler 403 at the bit rate of the orthogonal code (that is, double the maximum information rate). The correlator 420, which has prepared the groups of the orthogonal codes used on the transmitting side, calculates the correlations with the sampled signal sequence. Then, the maximum value code selector 404 compares the correlation values with each other, and makes a decision that the rate of the orthogonal code with the maximum correlation value is the rate of the transmitted information.

The correlator 420 in FIG. 6 will now be described in more detail. The sampling rate of the received signal is twice the maximum information rate Rmax. In the correlator 420, the orthogonal code 1 corresponds to the maximum information rate, and the orthogonal code Qmax corresponds to the minimum information rate. The integrators in the correlation calculation block each have an integration time of unit information length at respective information rates corresponding to the integrators. The square circuits 423 are each interposed to square the corresponding correlation value. The accumulators are provided because a plurality of pieces of information appear during the unit information interval of the minimum information rate, when the transmission rate is other than the minimum transmission rate. For example, when the maximum rate is eight times the minimum rate, the accumulator of the orthogonal code 1 carries out additions eight times, and the accumulator of the orthogonal code 2 carries out additions four times. Thus, the correlation values are compared at every unit information interval of the minimum rate, and the code giving the maximum value is selected, which code is indicated by the index Q' in FIG. 6.

In the arrangement as shown in FIG. 6, the sampled sequence of the received signal must be delayed to compensate for the delay due to the rate decision. The delay 405 is provided to ensure the delay.

Once the information rate has been decided, correlation is calculated between the orthogonal code sequence corresponding to the information rate and the sampled sequence of the received signal, and the sequence of the correlation values gives the received sequence.

Specifically, the orthogonal code selected by the maximum value code selector 404 is generated by the orthogonal code generator 407, and is multiplied with the delayed sampled sequence of the received signal, followed by the integration during the interval corresponding to the decided information rate.

Since the received information sequence is usually phase modulated, the correlation value sequence is phase demodulated by the phase demodulator 410 into the original data sequence. Thus, the receiver can detect the transmission rate by calculating the correlation with the orthogonal codes. Although the foregoing description is provided in connection with the CDMA communication scheme, it is obvious that the present detection method of the transmission rate can be applied to other communication schemes based on digital transmission and reception.

In the DS-CDMA described in the foregoing embodiment, it is known prior to the present application that pilot symbols are widely used for communications. The pilot symbols will now be described. The pilot symbols of a known pattern are inserted into data symbols periodically. Using the known pilot symbols makes it possible to estimate a transfer function of a channel, and to achieve accurate demodulation by correcting received data symbols. A section sandwiched by two successive sets of pilot symbols which are sent periodically is referred to as a slot. The change in the rate is carried out frame by frame, which consists of a plurality of slots.

In the CDMA, frequency drift correction, which is analogous to the radio central frequency drift correction between a transmitter and a receiver, can be carried out in response to information acquired by sampling the received signal at a rate equal to or greater than a spreading code rate (chip rate). Such a processing is generally performed on the receiving side using the pilot symbols of a known pattern inserted into the received signal.

In the present invention, to decide the rate which is changed on a frame by frame basis, the transmitted data is multiplied on the transmitting side by the orthogonal code with a length corresponding to the data rate. In this case, the entire transmitted data including the pilot symbols undergoes the rate change.

When trying to perform the drift correction or the like of such a received signal, the signal after sampling by the sampler 403 in FIG. 6 (that is, the signal sampled at the rate twice the symbol rate) cannot be used for the frequency drift correction or the like. Accordingly, the pilot symbols to be used for the frequency drift correction or the like must be acquired, after the rate decision result is obtained, by multiplying the received signal before the sampling with the sampler 403 in FIG. 6 by the orthogonal code corresponding to the decided rate to return the received signal to its original form.

To perform accurate measurement of the received SIR of the information symbols other than the pilot symbols, it is necessary for the information symbols to undergo demodulation (multiplication of the sampled sequence of the received signal by the orthogonal code with the maximum correlation value) based on the rate decision (decision of the orthogonal code) at every slot interval.

To achieve the drift correction or the like after the rate decision, the received signal must be delayed until the rate decision result of required accuracy is obtained, which necessitates to store the received signal in a memory. The memory used for this purpose, however, has a drawback that its scale becomes rather large in the CDMA receiver (this is because to store the information during the same duration, the capacity of such a memory must be increased by a factor of the processing gain as compared with the capacity of a memory for storing the sampling data at the symbol rate).

In view of this, the pilot symbols can always be transmitted at a fixed symbol rate (usually, at a symbol rate equal to the maximum data rate), in which case, the transmitter side does not carry out the multiplication of the transmitted signal by the orthogonal code corresponding to the data rate. This makes it possible for the receiving side to carry out the frequency drift correction or the like using that portion (pilot symbols) of the received signal before the rate decision result is obtained. In this case, the pilot symbols are transmitted at the same transmission power as that applied to the slot data rate.

Transmitting the pilot symbols at the fixed rate can make the rate decision of the pilot symbols unnecessary, and obviate the memory for storing the information at the chip rate, thereby being able to reduce the circuit scale.

In this case, since the pilot symbols are not used for the rate decision, it is expected that the accuracy of the rate decision is lowered slightly. However, its effect is considered to be very small because the ratio of duration the pilot symbols occupy in the transmitted data symbols in the frame (or in the slot) is rather small (less than 1/10 in normal cases).

In the CDMA mobile communications, the power of the transmitted signal must be controlled optimally according to its receiving side. In the variable rate transmission, since the transmission power is varied depending on the rate, the transmission power control must be carried out according to the rate.

Figure 7:
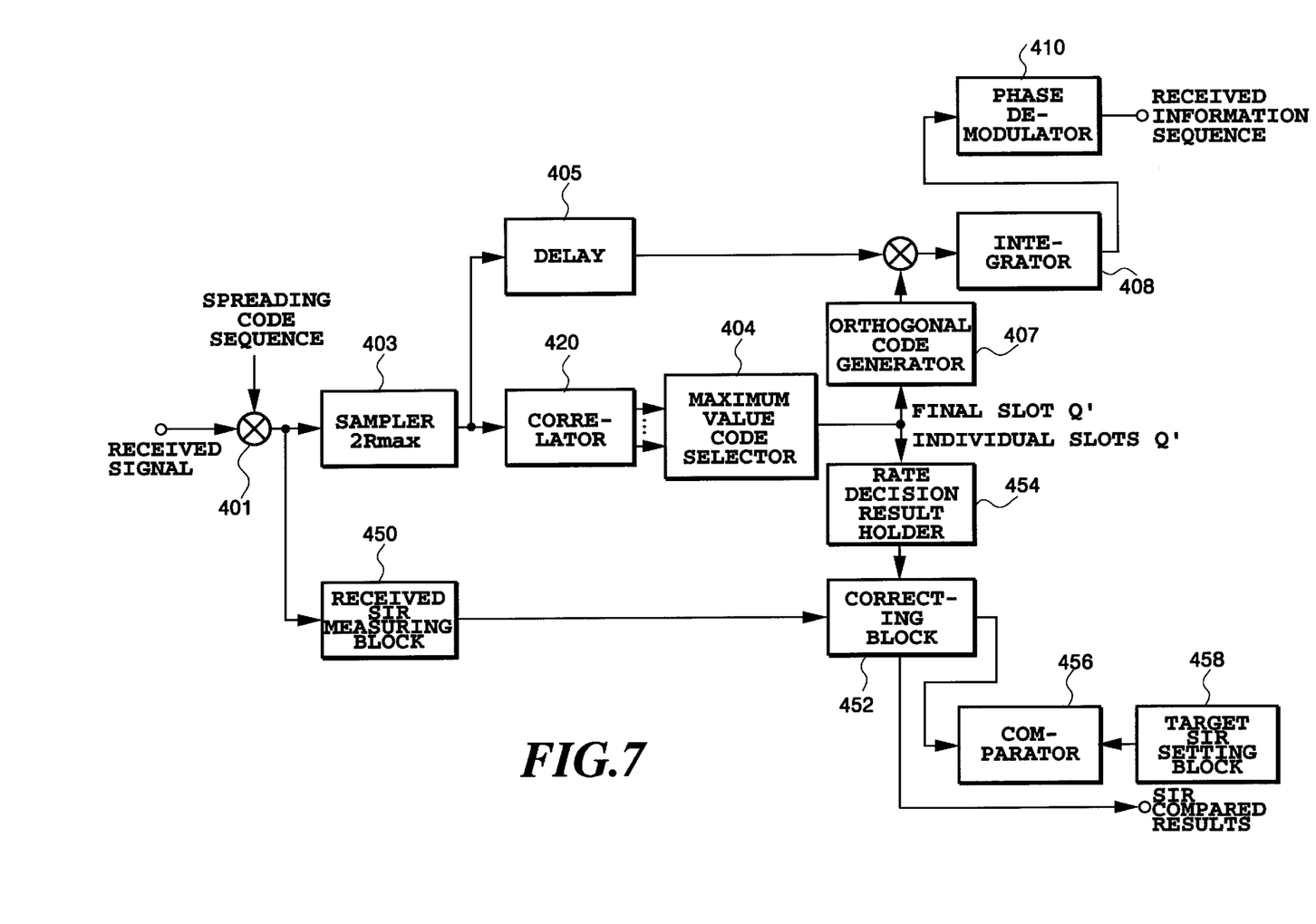
FIG. 7 is a block diagram showing a portion of the receiver, which measures the received SIR of a received signal.
Figure 8:
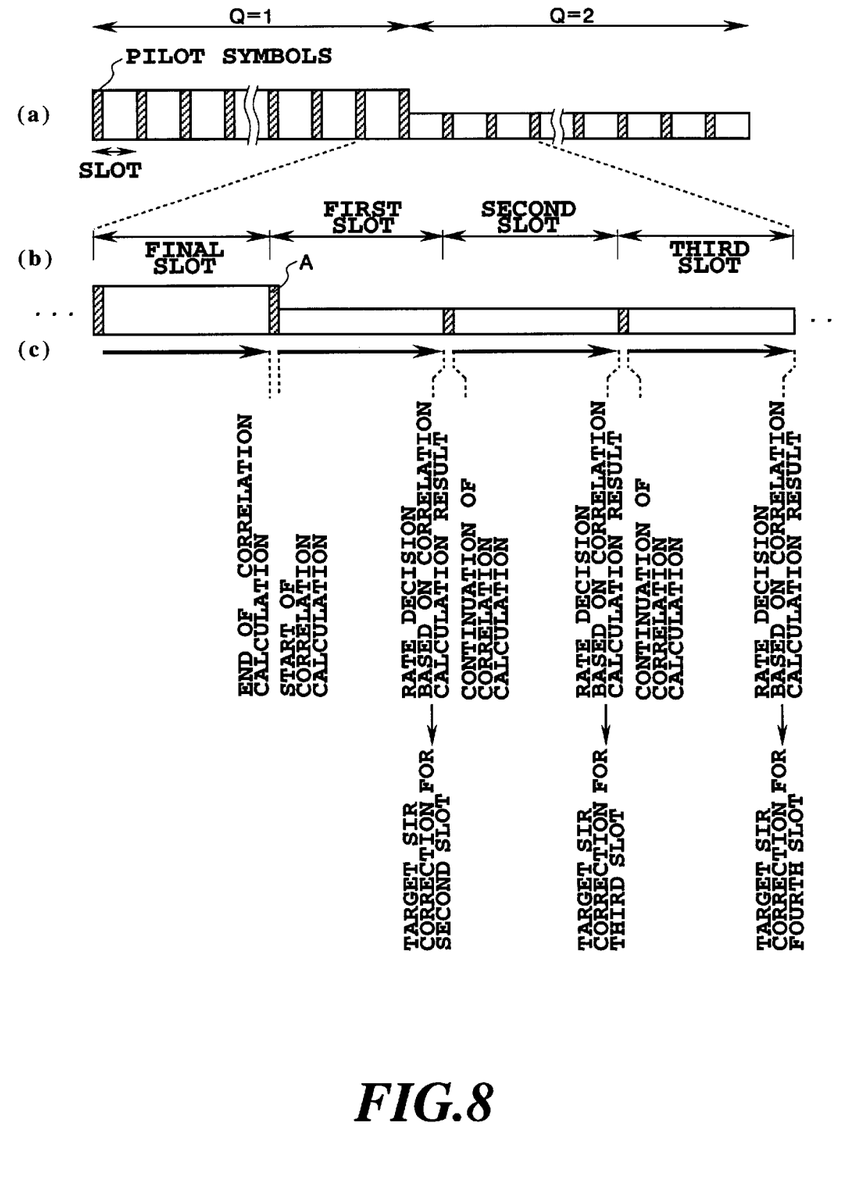
FIG. 8 is a diagram illustrating the operation of the receiver.

Referring to FIGS. 7 and 8, a receiving scheme will now be described which employs the transmission power control that controls the transmission power such that the receiving quality is maintained at constant by matching the received SIR (signal to interference ratio) measured on the receiving side to a target SIR, when the foregoing variable rate transmission is carried out.

FIG. 7 is a block diagram showing a configuration of the receiver, and FIG. 8 is a diagram illustrating the processing of slots received by the receiver with the structure as shown in FIG. 7. In FIG. 7, the same components as those of the receiver as shown in FIG. 6 are designated by the same reference numerals.

The received signal is despread using the spreading code sequence, followed by the calculation of the correlations by the correlator 420 using the foregoing orthogonal codes, and the selection of the orthogonal code that gives the maximum correlation value by the maximum value code selector 404. This enables the receiving side to recognize the transmission rate, and to extract the received information sequence by demodulating the delayed received signal using the orthogonal code as described before referring to FIG. 6.

The despread received signal is supplied to a received SIR measuring block 450, as well. The received SIR measuring block 450 measures the SIR of the received signal at every slot interval. A correcting block 452 corrects the SIR measured in each slot in accordance with the rate held in a rate decision result holder 454. A comparator 456 compares the received SIR which is corrected by the correcting block 452 with a target SIR fed from a target SIR setting block 458. The rate decision result holder 454 holds the rate obtained by the rate decision using the slots received up to the present instance. Since the transmission rate varies frame by frame consisting of a plurality of slots, the rate held in the rate decision result holder 454 is reset every time the frame is changed.

To perform accurate measurement of the received SIR of the information symbols other than the pilot symbols, it is necessary for the information symbols to undergo demodulation (multiplication of the sampled sequence of the received signal by the orthogonal code with the maximum correlation value) based on the rate decision (decision of the orthogonal code) at every slot interval.

A compared result, that is, the output of the comparator 456 is reflected on a transmission power command to the transmitting side. Since the compared result is obtained for each slot as described above, the transmission power command is issued at every slot interval.

As time is elapsed, the accuracy of the rate decision result is improved, and that at the final slot in the frame is best in average. The orthogonal code for demodulating the received information sequence is delayed by one frame interval by the delay 405, making it possible to use the decision result in the final slot.

FIG. 8(a) illustrates the received signal when the transmission of the signal is switched from the transmission rate Q=1 to Q=2. When transmitted at the rate Q=2, the transmission power is reduce. FIG. 8(b) illustrates in an enlarged scale the final slot of the frame transmitted at the rate Q=1, and a few initial slots of the frame transmitted at the rate Q=2. FIG. 8(c) illustrates the timings at which the correlation is calculated.

Referring to FIG. 8, a processing when the frame is switched will be described.

In FIG. 8(b), take notice of the final slot of the frame before the switch of the rate and the first slot of the frame immediately after the rate switch. As illustrated in FIG. 8(c), as the first slot begins, the correlation calculation is started. The rate is decided on the basis of the correlation calculation results, and the received SIR for the second slot is corrected. The correlation calculation of the second slot is continued, and the calculation results up to the end of the slot is used for correcting the target SIR of the third slot. Thus, since the second and following slots can carry out the comparison using the received SIR corrected according to the rate, accurate transmission power control can be achieved.

However, since the rate decision result holder 454 is reset frame by frame as described above, the first slot of the frame cannot obtain the rate decision results. As a result, since the correction according to the rate cannot be achieved, the first slot cannot carry out the accurate comparison of the received SIR.

Circumvention of this will now be described. FIG. 8(b) illustrates the case in which the pilot symbols indicated by A (that is, the initial pilot symbols of the first slot) are inserted by multiplying it by a power coefficient corresponding to the previous rate. Accordingly, when obtaining the received SIR of the pilot symbols, the correction according to the rate can use the rate obtained in the previous frame. This makes it possible to carry out the transmission power control by correcting the received SIR of the pilot symbols of the first slot, and by comparing the corrected SIR with the target SIR.

Such receiving control can be implemented by delaying the reset of the rate decision result holder 454 from the end of the frame to a time immediately before the rate decision results are obtained of the first slot of the next frame, and by carrying out the correction using the rate of the preceding frame held in the rate decision result holder 454. This makes it possible to implement the transmission power control matching the first slot of the frame using the received SIR of the pilot symbols, even if the transmission rate is changed from frame to frame.

Alternatively, since the accurate comparison of the received SIR cannot be expected with the first slot of the frame, the transmitting side can ignore the transmission power control command which is associated with the first slot of the frame and is sent from the receiving side, so as to avoid the transmission power control based on that transmission power control command. In this case, it is not necessary to assign the transmission power of the previous frame to the pilot symbols of the first slot in the frame as denoted by An of FIG. 8(b).

The negligence of the transmission power control command need not be limited to that of the first slot. For example, it is possible to suspend the transmission power control in initial slots (the first several slots of the frame), where the rate decision accuracy is rather low within the frame (that is, it is unlikely that the correction of the SIR measured values based on the decision rate can be carried out accurately), and to restart the transmission power control from the slot with which it becomes possible to make the rate decision at considerable accuracy. In this case, the slot number from which the transmission power is restarted is determined considering the final transmission quality (such as the average bit error rate).

In measuring the SIR of the received signal, it is possible to measure the received SIR of the pilot symbols that are transmitted at the fixed rate.

In the foregoing embodiment, the description is provided in connection with the configuration which corrects the received SIR from the received SIR measuring block 450 according to the transmission rate, as shown in FIG. 7. Since the configuration corrects the variations in the received SIR in response to the transmission rate, a conventional transmission power control system based on the received SIR and employing an invariable transmission rate can be applied with out change.

As an alternative of FIG. 7, other configurations can be implemented which compare the received SIR with the target SIR. For example, an arrangement is possible which corrects the target SIR in accordance with the transmission rate.

Another embodiment will now be described for circumventing the foregoing problem. As described before, when the pilot symbols are transmitted intermittently at the fixed rate, it is not necessary with the pilot symbols to make the rate decision or to correct the received SIR as long as the transmission power of the pilot symbols is not varied in response to the rate. Therefore, as long as the received SIR is measured using the pilot symbols transmitted at the fixed rate, the transmission power control can be achieved by comparing the received SIR of the pilot symbols with the target SIR without correcting that received SIR. In this case, the system for correcting the received SIR can be omitted.

As described above, the present invention can detect the rate on the receiving side without the information indicating the transmission rate.

In addition, the signal transmitted at the variable rate can undergo accurate transmission power control using the foregoing transmission power control.

What is claimed is:

1. A variable rate transmission method comprising the steps of:
    preparing a plurality of orthogonal codes whose lengths differ from each other and whose information rates are at least twice a maximum information rate, for one communication with one receiving side in which a rate of information to be transmitted changes, before the communication starts;
    selecting, during the communication, in accordance with the changing rate of information to be transmitted, one of the prepared orthogonal codes;
    multiplying a signal to be transmitted including the information by the selected orthogonal code; and
    transmitting the signal to be transmitted which has been multiplied by the selected orthogonal code, without increasing transmission amount for transmitting information about the selected orthogonal code, during the communication,
    wherein each of the plurality of orthogonal codes corresponds to each value that the rate of information transmitted assumes.

2. The variable rate transmission method as claimed in claim 1, wherein the step of preparing orthogonal codes prepares orthogonal codes obtained by successively generating, using lower degree matrices under a predetermined rule, higher degree ($2^N \times 2^N$ elements, where N is an integer equal to or greater than one) matrices with their row vectors orthogonal to each other, and by selecting one of row vectors of one of said matrices with a degree varying in accordance with each value that the rate of information to be transmitted assumes.

3. The variable rate transmission method as claimed in claim 2 wherein the step of preparing orthogonal codes prepares orthogonal codes such that the orthogonal codes do not include both an orthogonal code corresponding to one of row vectors of a $2^k \times 2^k$ element matrix (k is an integer less than N), and an orthogonal code corresponding to any one of row vectors of any one of $2^j \times 2^j$ element matrices (j is an integer greater than k) which includes as its sub-vector, said one of the row vectors of the $2^k \times 2^k$ element matrix or a row vector obtained by inverting said one of the row vectors of the $2^k \times 2^k$ element matrix.

4. The variable rate transmission method as claimed in claim 1, wherein the signal to be transmitted is further multiplied by spreading code sequence for spectrum spreading, and is transmitted at transmission power corresponding to the rate of information to be transmitted.

5. The variable rate transmission method as claimed in claim 4, further comprising the steps of:
    inserting pilot symbols of a known pattern periodically into data symbols corresponding to said information to be transmitted; and
    varying the rate on a frame by frame basis, said frame consisting of a plurality of slots defined by said pilot symbols.

6. The variable rate transmission method as claimed in claim 5, further comprising the step of controlling the transmission power on a slot by slot basis in response to a transmission power control command sent from a receiving side.

7. The variable rate transmission method as claimed in claim 6, further comprising the step of transmitting, in a slot immediately after a rate change, the pilot symbols at power corresponding to the rate before the rate change.

8. The variable rate transmission method as claimed in claim 6, further comprising the step of suspending the transmission power control by said transmission power control command that is associated with at least one of slots immediately after a rate change.

9. The variable rate transmission method as claimed in claim 8, wherein a number of slots with which said transmission power control is suspended is determined in response to transmission quality.

10. The variable rate transmission method as claimed in claim 5, where said pilot symbols are transmitted at a same rate as that of said frame.

11. The variable rate transmission method as claimed in claim 5, where said pilot symbols are transmitted at a fixed rate.

12. A variable rate receiving method for receiving a signal transmitted by the variable rate transmission method as claimed in claim 1, said receiving method comprising the steps of:
    generating a sampled sequence of a received signal by sampling the received signal at a rate of one of the orthogonal codes, and calculating correlations between the sampled sequence of the received signal and the plurality of orthogonal codes with different lengths;
    deciding an orthogonal code that gives a maximum correlation by comparing correlation values obtained as a result of the calculation of the correlations; and
    demodulating the received signal by multiplying the sampled sequence of the received signal by the orthogonal code that gives the maximum correlation value.

13. A receiving method for receiving a signal transmitted by the variable rate transmission method as claimed in claim 6, said receiving method comprising the steps of:
- generating a sampled sequence of a received signal by sampling the received signal at a rate of one of the orthogonal codes;
- calculating correlations between the sampled sequence of the received signal and the plurality of orthogonal codes with different lengths;
- deciding an orthogonal code that gives a maximum correlation by comparing correlation values obtained as a result of the calculation of the correlations;
- demodulating the received signal by multiplying the sampled sequence of the received signal by the orthogonal code that gives the maximum correlation value, and measuring a received SIR for each slot of the received signal;
- correcting the received SIR according to a rate of the orthogonal code decided by the step of deciding;
- comparing the corrected received SIR with a target SIR; and
- generating a transmission power control command in response to a result of said comparing.

14. The receiving method as claimed in claim 13, wherein demodulation of said received signal is carried out slot by slot.

15. A receiving method for receiving a signal transmitted by the variable rate transmission method as claimed in claim 7, said receiving method comprising the steps of:
- generating a sampled sequence of a received signal by sampling the received signal at a rate of one of the orthogonal codes;
- calculating correlations between the sampled sequence of the received signal and the plurality of orthogonal codes with different lengths;
- deciding an orthogonal code that gives a maximum correlation by comparing correlation values obtained as a result of the calculation of the correlations;
- demodulating the received signal by multiplying the sampled sequence of the received signal by the orthogonal code that gives the maximum correlation value;
- measuring a received SIR of said pilot symbols for a slot immediately after a rate change, and a received SIR for each of other slots;
- correcting the received SIR for each of other slots according to a rate decided by the decision of the orthogonal code;
- correcting the received SIR of the pilot symbols according to a rate before the rate change;
- comparing the corrected received SIR with a target SIR; and
- generating a transmission power control command in response to a result of said comparing.

16. A receiving method for receiving a signal transmitted by the variable rate transmission method as claimed in claim 11, said receiving method comprising the steps of:
- generating a sampled sequence of a received signal by sampling the received signal at a rate of one of the orthogonal codes;
- calculating correlations between the sampled sequence of the received signal and the plurality of orthogonal codes with different lengths;
- deciding an orthogonal code that gives a maximum correlation by comparing correlation values obtained as a result of the calculation of the correlations;
- demodulating the received signal by multiplying the sampled sequence of the received signal by the orthogonal code that gives the maximum correlation value;
- measuring a received SIR of said pilot symbols at the fixed rate;
- correcting the received SIR according to a rate decided by the decision of the orthogonal code;
- comparing the corrected received SIR with a target SIR; and
- generating a transmission power control command in response to a result of said comparing.

17. A variable rate transmitter comprising:
- an orthogonal code generator for preparing a plurality of orthogonal codes whose lengths differ from each other and whose information rates are at least twice a maximum information rate, for one communication with one receiving side in which a rate of information to be transmitted changes, before the communication starts, and generating, during the communication, in accordance with the changing rate of information to be transmitted, one of the prepared orthogonal codes;
- a multiplier for multiplying a signal to be transmitted including the information by the orthogonal code fed from the orthogonal code generator; and
- a transmitter for transmitting the signal to be transmitted which has been multiplied by the orthogonal code fed from the orthogonal code generator, without increasing transmission amount for transmitting information about the orthogonal code fed from the orthogonal code generator, during the communication,
- wherein each of the plurality of orthogonal codes corresponds to each value that the rate of information to be transmitted assumes.

18. The variable rate transmitter as claimed in claim 17, wherein the orthogonal code generator prepares orthogonal codes obtained by successively generating, using lower degree matrices under a predetermined rule, higher degree ($2^N \times 2^N$ elements, where N is an integer equal to or greater than one) matrices with their row vectors orthogonal to each other, and by selecting one of row vectors of one of said matrices with a degree varying in accordance with each value that the rate of information to be transmitted assumes.

19. The variable rate transmitter as claimed in claim 18, wherein the orthogonal code generator prepares orthogonal codes such that the orthogonal codes do not include both a orthogonal code corresponding to one of row vectors of a $2^k \times 2^k$ element matrix, (k is an integer less than N), and an orthogonal code corresponding to any one of row vectors of any one $2^j \times 2^j$ element matrices, (j is an integer greater than k), which includes as its sub-vector, said one of the row vectors of the $2^k \times 2^k$ element matrix or a row vector obtained by inverting said one of the row vectors of the $2^k \times 2^k$ element matrix.

20. The variable rate transmitter as claimed in claim 17, further comprising:
- a spreading sequence generator for generating a spreading code sequence for spectrum spreading;
- a multiplier for multiplying the signal to be transmitted by the spreading code sequence fed from the spreading sequence generator; and
- a transmitter for varying transmission power in response to the rate of information to be transmitted.

21. The variable rate transmitter as claimed in claim 20, further comprising a pilot symbol generator for generating pilot symbols of a known pattern periodically, wherein said pilot symbols are inserted into data symbols corresponding to said information to be transmitted, and the rate is varied on a frame by frame basis, said frame consisting of a plurality of slots defined by said pilot symbols.

22. The variable rate transmitter as claimed in claim 21, further comprising a transmission power controller for controlling the transmission power on a slot by slot basis in response to a transmission power control command sent from a receiving side.

23. The variable rate transmitter as claimed in claim 22, wherein said pilot symbols are transmitted, in a slot immediately after a rate change, at power corresponding to the rate before the rate change.

24. The variable rate transmitter as claimed in claim 21, where said pilot symbols are transmitted at a same rate as that of said frame.

25. The variable rate transmitter as claimed in claim 21, where said pilot symbols are transmitted at a fixed rate.

26. The variable rate transmitter as claimed in claim 22, wherein the transmission power control by said transmission power control command that is associated with at least one of slots immediately after a rate change is suspended.

27. The variable rate transmitter as claimed in claim 26, wherein a number of slots with which said transmission power control is suspended is determined in response to transmission quality.

28. A variable rate receiver for receiving a signal transmitted by the variable rate transmission method as claimed in claim 1, said receiver comprising:
- a sampler for generating a sampled sequence of a received signal by sampling the received signal at a rate of one of the orthogonal codes;
- a correlator for calculating correlations between the sampled sequence of the received signal from said sampler and the plurality of orthogonal codes with different lengths;
- an orthogonal code decision block for deciding an orthogonal code that gives a maximum correlation by comparing correlation values obtained as a result of the calculation of the correlations;
- an orthogonal code generator for generating the orthogonal code decided by said orthogonal code decision block; and
- a multiplier for multiplying the sampled sequence of the received signal by the orthogonal code from said orthogonal code generator to demodulate the received signal.

29. A receiver for receiving a signal transmitted by the variable rate transmission method as claimed in claim 6, said receiver comprising:
- a sampler for generating a sampled sequence of a received signal by sampling the received signal at a rate of one of the orthogonal codes;
- a correlator for calculating correlations between the sampled sequence of the received signal and the plurality of orthogonal codes with different lengths;
- an orthogonal code decision block for deciding an orthogonal code that gives a maximum correlation by comparing correlation values obtained as a result of the calculation of the correlations;
- an orthogonal code generator for generating the orthogonal code decided by said orthogonal code decision block;
- a multiplier for multiplying the sampled sequence of the received signal by the orthogonal code from said orthogonal code generator;
- a received SIR for measuring a received SIR for each slot of the received signal;
- a correcting block for correcting the received SIR according to a rate of the orthogonal code decided; and
- a comparator for comparing the corrected received SIR with a target SIR, wherein a transmission power control command is generated in response to a result of said comparing.

30. The receiver as claimed in claim 29, wherein demodulation of said received signal is carried out slot by slot.

31. A receiver for receiving a signal transmitted by the variable rate transmission method as claimed in claim 7, said receiver comprising:
- a sampler for generating a sampled sequence of a received signal by sampling the received signal at a rate of one of the orthogonal codes;
- a correlator for calculating correlations between the sampled sequence of the received signal from said sampler and the plurality of orthogonal codes with different lengths;
- an orthogonal code decision block for deciding an orthogonal code that gives a maximum correlation by comparing correlation values obtained as a result of the calculation of the correlations;
- an orthogonal code generator for generating the orthogonal code decided by said orthogonal code decision block;
- a multiplier for multiplying the sampled sequence of the received signal by the orthogonal code from said orthogonal code generator;
- a received SIR measuring block for measuring a received SIR of said pilot symbols for a slot immediately after a rate change, and a received SIR for each of other slots;
- a correcting block for correcting the received SIR for each of other slots according to a rate decided by the decision of the orthogonal code, and for correcting the received SIR of the pilot symbols according to a rate before the rate change; and
- a comparator for comparing the corrected received SIR with a target SIR,
- wherein a transmission power control command is generated in response to a result of said comparing.

32. A receiver for receiving a signal transmitted by the variable rate transmission method as claimed in claim 11, said receiver comprising:
- a sampler for generating a sampled sequence of a received signal by sampling the received signal at a rate of one of the orthogonal codes;
- a correlator for calculating correlations between the sampled sequence of the received signal and the plurality of orthogonal codes with different lengths;
- an orthogonal code decision block for deciding an orthogonal code that gives a maximum correlation by comparing correlation values obtained as a result of the calculation of the correlations;
- a multiplier for multiplying the sampled sequence of the received signal by the orthogonal code that gives the maximum correlation value;
- a received SIR measuring block for measuring a received SIR of said pilot symbols at the fixed rate;
- a correcting block for correcting the received SIR according to a rate decided by the decision of the orthogonal code; and a comparator for comparing the corrected received SIR with a target SIR, wherein a transmission power control command is generated in response to a result of said comparing.

33. A variable rate receiving method comprising the steps of:

generating a sampled sequence of a received signal by sampling the received signal at a rate of one of the orthogonal codes, and calculating correlations between the sampled sequence of the received signal and the plurality of orthogonal codes with different lengths;

deciding an orthogonal code that gives a maximum correlation by comparing correlation values obtained as a result of the calculation of the correlations; and demodulating the received signal by multiplying the sampled sequence of the received signal by the orthogonal code that gives the maximum correlation value.

34. A variable rate receiver comprising:

a sampler for generating a sampled sequence of a received signal by sampling the received signal at a rate of one of the orthogonal codes;

a correlator for calculating correlations between the sampled sequence of the received signal from said sampler and the plurality of orthogonal codes with different lengths;

an orthogonal code decision block for deciding an orthogonal code that gives a maximum correlation by comparing correlation values obtained as a result of the calculation of the correlations;

an orthogonal code generator for generating the orthogonal code decided by said orthogonal code decision block; and a multiplier for multiplying the sampled sequence of the received signal by the orthogonal code from said orthogonal code generator to demodulate the received signal.

* * * * *